United States Patent

[11] 3,593,563

[72] Inventors Ralph A. Marmor;
David K. Cunningham, both of Minneapolis, Minn.
[21] Appl. No. 744,386
[22] Filed July 12, 1968
[45] Patented July 20, 1971
[73] Assignee The Pillsbury Company
Minneapolis, Minn.

[54] FLAMMABILITY TESTER
8 Claims, 3 Drawing Figs.
[52] U.S. Cl. .................................................. 73/15.4, 73/36
[51] Int. Cl. .................................................. G01n 1/00
[50] Field of Search .................................. 73/15.6, 17, 36, 432

[56] References Cited
FOREIGN PATENTS
161,560 7/1964 U.S.S.R. .................. 73/15

OTHER REFERENCES
FEDERAL FIRE COUNCIL, MINUTES OF MEETING. "Burning Behavior of Building Finish Materials: Two Test Methods" by A. F. Roberston, pp. 21— 35, April 17, 1962 available P.O. 73/15

Primary Examiner—Richard C. Queisser
Assistant Examiner—John K. Lunsford
Attorneys—Ronald E. Lund, James V. Harmon and M. Paul Hendrickson ABSTRACT: A flammability tester for measuring the ignition temperature of materials in a gas stream is composed of a tube containing a small pan in which the product is placed. Hot air is blown into one end of the tube. Convection and radiation cause the outlet end of the tube to be cooler than the inlet end. A temperature sensor such as a thermocouple is placed in the pan. A second temperature sensor is placed in the airstream immediately above the pan. When the hot airstream heats the material being tested to a sufficiently high temperature, the material ignites. The temperature within the product then rises above the temperature of the surrounding airstream thereby defining the ignition temperature.

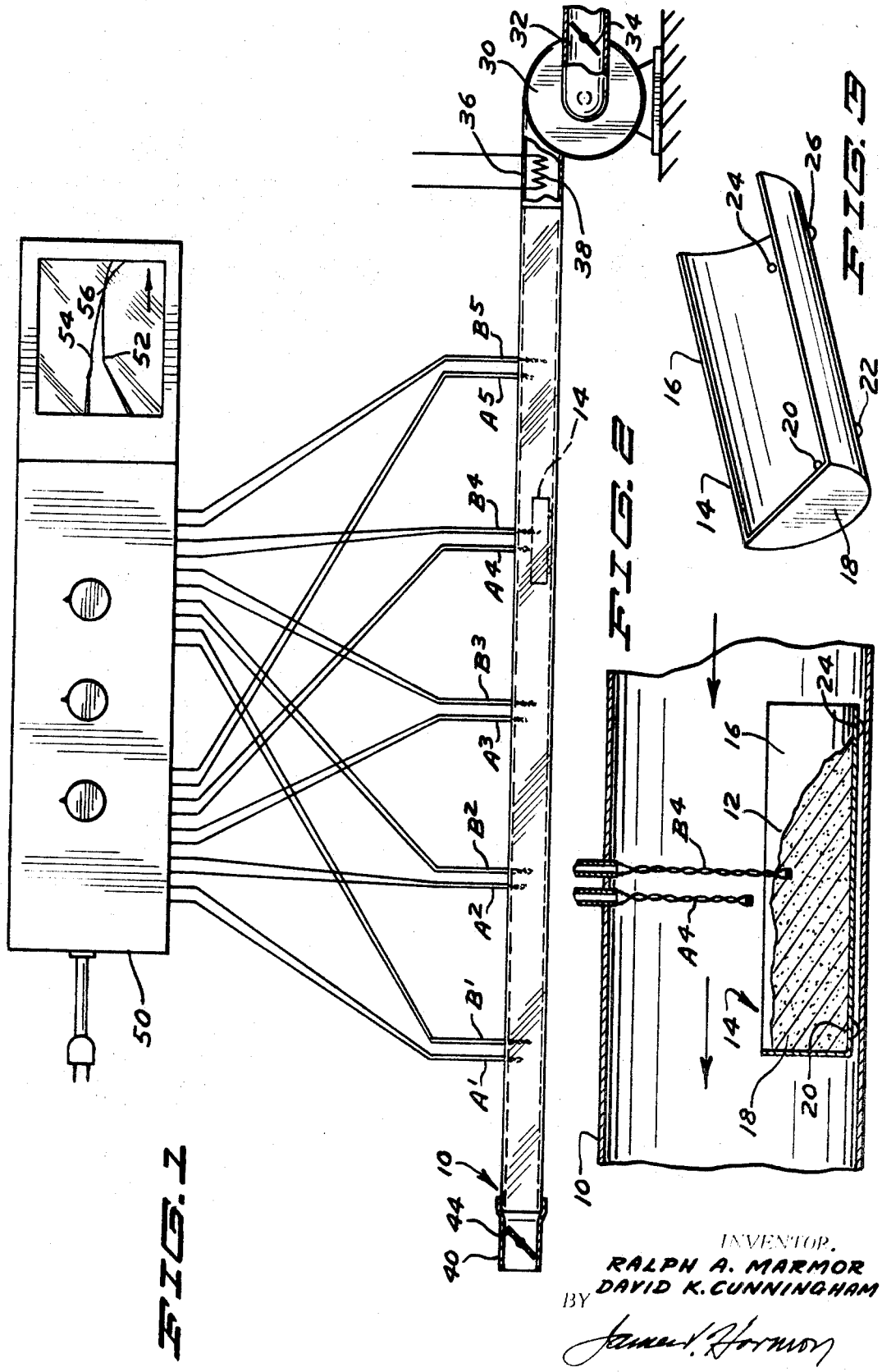

FLAMMABILITY TESTER

Numerous devices have been previously proposed for measuring the ignition temperature of solids and liquids. These prior devices have been to some extent ineffective. One of the shortcomings present in existing equipment is its inability to quickly measure the ignition temperature of a solid material which is processed in a heated gas stream. Another problem is the in-exactness of the results obtained with prior equipment.

A great many materials are processed in the form of fine dustlike particles. Frequently, under conditions of treatment this material is suspended in an oxidizing atmosphere which produces a fire or explosion hazard.

The combustability of air entrained solids is an important consideration in, for example, the production of cake mix by spray drying. In this process an aqueous suspension of food material is sprayed into a drying chamber that contains a rising current of hot dry air. A spray dryer normally consists of a rather large vertically disposed cylindrical chamber of silo into which the material being dried is sprayed through a nozzle located at the top of the chamber. As minute droplets of the material dry, they become combustible. The evaporation of water from the sprayed particles prevents them from attaining a temperature much above the boiling point of water. It is, however, impossible to prevent some accumulation of sprayed product on the interior of the dryer. As the accumulated product dries, it will be heated to the temperature of the air introduced to the dryer. If the air temperature is above the ignition temperature of the dried product, the product will ignite.

In initial tests performed to test the effectiveness of the invention, a muffle furnace was used as heat source. Several 10 gram samples were placed in evaporating dishes. The dishes were placed in the furnace at room temperature. The temperature controller was set at 800° F. The door was turned on and the samples watched for signs of decomposition. The temperature increased very slowly at first, but once the walls of the furnace became hot, the temperature increased approximately 20° F. per minute.

These tests were considered unsatisfactory because the dishes containing the samples were on the floor of the furnace which was much hotter than indicated by the thermocouple positioned about midway between the floor and ceiling of the furnace.

Another problem encountered with the use of furnaces of this kind for the purpose of measuring the flammability derived from the fact that no gas stream is present within the oven. Accordingly, after the oven has been in operation for a time, the vapor evolved during the heating process will fill the oven. This, of course, is undesirable since the product is not exposed to air.

Still another problem associated with these conventional ovens is the temperature differential within the oven and the temperature lag caused by localized heating either at the top or sides of the oven where the heating elements are located.

As mentioned briefly above, the present invention is concerned with evaluating the flammability of products which are present either in a gaseous suspension or in a gas stream. It is important in making accurate measurements that the sample be subjected to the same conditions to which it is subjected under normal conditions. It was discovered that such conditions are provided by placing the product in a moving stream of gas heated sufficiently to ignite the product.

In view of these and other deficiencies of the prior art it is a primary object of the present invention to provide an improved apparatus for accurately measuring the ignition temperature of liquid or solid sample in an atmosphere of a predetermined composition.

Another object is the provision of an improved apparatus for accurately measuring the temperature at which the sample will ignite spontaneously in a heated atmosphere.

Another object is to provide an improved test apparatus of the type described in which a very small temperature lag exists between the sample and the surrounding atmosphere.

A further object of the invention is the provision of an improved test apparatus of the type described in which no evolved vapor will collect in the test chamber.

Another object is the provision of an improved apparatus of the type described in which the temperature at which the exothermic reaction begins within the sample can be accurately measured.

Another object is the provision of an improved apparatus of the type described in which a means is provided for accurately controlling the temperature and velocity of a heated airstream for regulating the temperature of a test sample.

A further object is the provision of an improved apparatus of the type described in which the material can be tested at any of a wide range of heating rates.

Another object is the provision of an improved test apparatus of the type described in which the material can be tested at any of a wide range of temperatures.

These and other more detailed and specific objects of the invention will be apparent in view of the following specification and drawings wherein:

FIG. 1 is a semidiagrammatic side elevational view of an apparatus embodying the invention.

FIG. 2 is a vertical sectional view taken through the test chamber of FIG. 1 on a greatly enlarged scale.

FIG. 3 is a perspective view of one form of sample pan.

In accordance with the invention, the sample that is to be tested (usually consists of a granular or powdered solid) is placed in an open pan located within a test cell. Heated air is passed through the cell at a velocity at least sufficient to prevent evolved gases from collecting and at a sufficiently high temperature to ultimately heat the test material to its ignition point. Temperature sensors are placed within the sample and within the airstream immediately adjacent to the sample. The temperature of each sensor is continuously recorded. The point at which the sample temperature rises above the air temperature defines the ignition temperature of the sample.

The invention will be better understood by reference to the figures. As seen in FIG. 1 an elongated test cell 10 composed of a glass tube is in this case 4 feet long and 2 inches in diameter. The tube 10 is provided with a plurality of temperature sensors such as thermocouples that are divided into a first set of environmental thermocouples designated A1 to A5 and a second set of sample thermocouples designated B1 to B5 arranged in pairs with each pair being spaced at equal intervals from the next adjacent pair. The thermocouples A1 to A5 are positioned at the top of the tube D and are thus located within the gas stream. The thermocouples B1 to B5 are located further down in the tube so as to project into the sample 12 which is positioned within a pan 14 consisting of a curved bottom wall 16 having legs 20, 22, 24 and 26 and a flat end wall 18.

Connected to the right end of the test cell 10 is a blower 30 having an inlet duct 32 provided with an air supply control valve 34, an outlet duct 36 in which is located an electric heating element 38. At the downstream or outlet end 40 of the test cell 10 is a shut-off valve 44 within a removable end section 45 which can be used to partially close the outlet end of the tube for producing a slight back pressure within the tube to increase the temperature of the material within the test chamber by a small increment.

Both of the environmental thermocouples A and the sample measuring thermocouples B are connected to a continuous recording device such as a strip chart recorder 50 which displays the temperature of thermocouple A4 at 52 and the thermocouple B4 at 54. It can be seen that the traces 52 and 54 cross at point 56 which defines the temperature at which the sample undergoes ignition. In this way the temperature at the initiation of the exothermic reaction is accurately exhibited on the strip chart record.

The operation of the apparatus will now be described. A powdered sample 12 of, for example, about 20 grams is placed in the pan 14. Care should be taken not to pack the material in the pan. The pan 14 is then introduced in the end of the tube 10 opposite the heater and after removing the removable tip 45. Any of the thermocouples B1 to B5 is placed within the sample 12 depending upon the ignition temperature expected. If lower temperatures appear to be required, the container should be moved to one of the sensors at the left. If higher temperatures are needed, the pan is moved toward the right. In this way the apparatus can test materials at a wide variety of temperatures.

The valve 44 is then adjusted to provide the desired amount of back pressure for fine adjustment of the temperature within the cell. Thus, if higher temperatures are desired the valve 44 is moved toward the closed position. If lower temperatures are desired, valve 44 is opened farther. The blower 30 and the heater 38 are then started and the valve 34 is adjusted to control the air velocity and temperature within the cell. If valve 34 is moved toward the closed position, the temperature within the cell 10 will increase. If valve 34 is opened farther, the temperature within the chamber will be reduced. While the air velocity within the cell is not considered critical, we have obtained excellent results using an air velocity of about 1,100 linear feet per minute. It should be understood, however, that the velocity need only be sufficient to heat the sample and remove vapor evolved by the sample during the heating process. The recorder is then started. As the apparatus continues to run, the traces 52 and 54 will gradually rise indicating an increase in temperature over a period of ½ hour to 1 hour as the heater 38 becomes warmer and the walls of the cell 10 become heated. Ultimately, if the sample is combustible, the temperature of the sensor B4 within the sample 12 will rise above the temperature of the sensor A4 indicating that the ignition point has been reached. In practice, a test may be run as long as 1 or 1½ hours before the product reaches the ignition temperature.

In an apparatus embodying the invention having a test cell 4 feet long and 2 inches in diameter, each pair of thermocouples was 10° C. cooler than the next adjacent upstream pair. For testing food products the apparatus was usually run at temperatures between about 300° to 400° C. The invention can be used with any powdered or granular solid or liquid in which case both ends of the pan 14 should be closed.

It is apparent that many modifications and variations of this invention as hereinbefore set forth may be made without departing from the spirit and scope thereof. The specific embodiments described are given by way of example only and the invention is limited only by the terms of the appended claims. For example, while the temperature sensors have been shown as thermocouples, it will be understood that glass thermometers, thermistors or resistance thermometers can be used if desired but have the disadvantage of requiring continuous visual observation for accurately determining the point at which the sample temperature increased above the environmental temperature.

We claim:

1. An apparatus for measuring the ignition temperature of a test sample comprising a test cell into which the product is placed during the test, a means for passing a gas through the cell at a flow rate at least sufficient to remove any significant quantity of vapor evolved from the sample during the heating thereof, a heater operatively associated with the apparatus in heat transfer relationship with the sample during the test to heat the sample, a first temperature sensor connected to the sample for determining the temperature of the sample during the heating thereof and displaying the rise in temperature of the sample as the sample is heated to its ignition temperature and a second temperature sensor positioned within the cell immediately adjacent to the sample for sensing the temperature of the surrounding gas whereby a significant increase of the temperature of the sample above the temperature sensed by the second sensor will identify the ignition temperature of the sample.

2. The apparatus of claim 1 wherein the cell comprises an elongated tube and a plurality of adjacent pairs of sensors mounted at longitudinally spaced points on the tube, one sensor of each pair comprising an environmental sensor positioned in the gas stream in the cell and the other sensor comprising a test sample measuring sensor positioned so as to be located within the sample present within the test cell, whereby the test sample can be located in the tube adjacent to any selected pair of sensors with the sample measuring sensor located within the sample and the environmental sensor located in the gas stream immediately adjacent to the sample.

3. The apparatus according to claim 2 wherein at least one of the sensors comprises a thermocouple and a temperature recording means wired to the thermocouple for displaying the temperature of the thermocouple.

4. The apparatus of claim 1 wherein said temperature sensor comprises a thermocouple and a recorder wired to the thermocouple for displaying the temperature of the thermocouple.

5. The apparatus of claim 1 wherein said heater comprises a heating means located in the stream of gas introduced to the test cell for heating the gas introduced to the test cell whereby the sample is heated to its ignition temperature by heated gas in the cell.

6. A flammability test apparatus for displaying the ignition temperature of a sample comprising support means for the sample, a means for heating a sample located on the support, a pair of temperature sensors located adjacent the support, one sensor being positioned to sense the temperature of the atmosphere surrounding the sample and the second temperature sensor being positioned within the sample, means for heating the atmosphere surrounding the sample, a means for recording and continuously displaying the temperature of each sensor whereby the point at which the temperature of the sample increases above the temperature of the atmosphere surrounding the sample will define the ignition temperature of the material undergoing test.

7. The apparatus of claim 6 wherein a means for recording and displaying temperature comprises a strip chart recorder including a readout means having a plurality of indicators for representing one trace corresponding to the temperature of each of the sensors.

8. The apparatus of claim 7 wherein each sensor comprises a thermocouple.